(12) United States Patent
Fechtel et al.

(10) Patent No.: US 10,742,450 B2
(45) Date of Patent: Aug. 11, 2020

(54) DEVICE AND METHOD FOR GENERATING CHANNEL ESTIMATION COEFFICIENTS FOR CHANNEL ESTIMATION FILTERING

(71) Applicant: Intel IP Corporation, Santa Clara, CA (US)

(72) Inventors: Stefan Fechtel, Zorneding (DE); Cecilia Carbonelli, Munich (DE); Stefan Franz, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 45 days.

(21) Appl. No.: 15/575,420

(22) PCT Filed: May 18, 2016

(86) PCT No.: PCT/EP2016/061111
§ 371 (c)(1),
(2) Date: Nov. 20, 2017

(87) PCT Pub. No.: WO2016/202516
PCT Pub. Date: Dec. 22, 2016

(65) Prior Publication Data
US 2018/0159704 A1 Jun. 7, 2018

(30) Foreign Application Priority Data
Jun. 18, 2015 (DE) .................. 10 2015 109 752

(51) Int. Cl.
*H04L 25/02* (2006.01)

(52) U.S. Cl.
CPC ........ *H04L 25/0222* (2013.01); *H04L 25/021* (2013.01); *H04L 25/0206* (2013.01);
(Continued)

(58) Field of Classification Search
CPC ............. H04L 25/0222; H04L 25/0206; H04L 25/021; H04L 25/0224; H04L 25/0256; H04L 25/0242
See application file for complete search history.

(56) References Cited

U.S. PATENT DOCUMENTS

| | | | |
|---|---|---|---|
| 2007/0253321 A1 | 11/2007 | Akita et al. | |
| 2013/0065537 A1* | 3/2013 | Yepez | H04L 25/0224 455/67.13 |

(Continued)

FOREIGN PATENT DOCUMENTS

| | | |
|---|---|---|
| CN | 101326740 A | 12/2008 |
| CN | 101359926 A | 2/2009 |

(Continued)

OTHER PUBLICATIONS

International Search Report dated Jul. 22, 2016 for International Application PCT/EP2016/061111.
(Continued)

*Primary Examiner* — Ricky Q Ngo
*Assistant Examiner* — Stephen N Steiner
(74) *Attorney, Agent, or Firm* — Viering, Jentschura & Partner MBB (57) ABSTRACT

A channel estimation coefficients generator (200) for generating channel estimation coefficients for channel estimation filtering includes: a parameter acquisition unit (205) configured to acquire a first set of input parameters (208) and to acquire a second set of input parameters (209), wherein a time variability of the first set of input parameters (208) is smaller than a time variability of the second set of input parameters (209); a first channel estimation coefficients generator (201) configured to generate a prototype set of channel estimation coefficients (202) based on the first set of input parameters (208); and a second channel estimation coefficients generator (203) configured to generate a refined
(Continued)

set of channel estimation coefficients (204) based on the prototype set of channel estimation coefficients (202) and based on the second set of input parameters (209).

19 Claims, 7 Drawing Sheets

(52) U.S. Cl.
CPC ...... *H04L 25/0224* (2013.01); *H04L 25/0256* (2013.01); *H04L 25/0242* (2013.01)

(56) References Cited

U.S. PATENT DOCUMENTS

| | | | |
|---|---|---|---|
| 2013/0070831 | A1 | 3/2013 | Tulino et al. |
| 2014/0369213 | A1* | 12/2014 | Kim .................... H04W 72/085 370/252 |
| 2016/0127922 | A1* | 5/2016 | Krishnamoorthy ... H04L 25/022 370/329 |

FOREIGN PATENT DOCUMENTS

| | | |
|---|---|---|
| CN | 101969416 A | 2/2011 |
| EP | 2413551 A1 | 2/2012 |
| EP | 2472805 A1 | 7/2012 |
| WO | 2009/034221 A1 | 3/2009 |
| WO | 2014/180510 A1 | 11/2014 |

OTHER PUBLICATIONS

Athaudage, Chandranath R.N., et al. "Enhanced MMSE Channel Estimation Using Timing Error Statistics for Wireless OFDM Systems." IEEE Transactions on Broadcasting, vol. 50, No. 4, Dec. 2004. pp. 369-376.

Chinese Search Report based on Application No. 2016800277488, dated May 15, 2020, 2 pages (for reference purpose only).

* cited by examiner

DEVICE AND METHOD FOR GENERATING CHANNEL ESTIMATION COEFFICIENTS FOR CHANNEL ESTIMATION FILTERING

This application is a National Phase entry application of International Patent Application No. PCT/EP2016/061111 filed May 18, 2016, which claims priority to German Application 10 2015 109 752.4 filed on Jun. 18, 2015, entitled "DEVICE AND METHOD FOR GENERATING CHANNEL ESTIMATION COEFFICIENTS FOR CHANNEL ESTIMATION FILTERING" in the name of Stefan Fechtel et al. and is hereby incorporated by reference in their entirety.

FIELD

The disclosure relates to a channel estimation coefficients generator for generating channel estimation coefficients for channel estimation filtering and a method for generating such coefficients. Aspects of the disclosure relate to adaptive coefficient synthesis for OFDM channel estimation filtering in 4G mobile networks and networks beyond 4G.

BACKGROUND

Modern cellular networks face the challenge that the demand for data traffic is increasing dramatically. Network operators need to modify their networks to increase the overall capacity. In both homogenous and heterogeneous networks, the mobile user equipment (UE) is faced not only with varying channel conditions, but also with multiple interfering cells whose signals and channels likewise exhibit time/frequency-selective behavior. In addition, modem frontend non-idealities such as timing/frequency offsets and signal level variations, are often required to be compensated for by channel estimation. Channel estimation filtering, which is key to the proper receiver operation, therefore faces multiple challenges which can be grouped into the following five categories:

(1.) reference signal configuration (R): the reference signal (RS) pattern in time/frequency plane, relative to resource element (RE) positions for which the channel is to be estimated may dynamically change, depending on the standard, transmission mode, logical channel (in LTE, e.g., CRS for PDCCH and TM1-6 PDSCH, DMRS for TM7-10 PDSCH), time (first/last slots, TDD special SF, MBSFN SF, etc.), and frequency (edges of OFDM spectrum). (2.) channel parameters (C): the physical channel parameters may change with time, in particular, delay spread/shift and Doppler spread/shift. (3.) noise parameters (N): the level of thermal noise and background interference (not considered in interference mitigation) and thus the SNR may also change with time. (4.) interference parameters (I): depending on interferer scheduling, the interference/SIR levels may be strongly dynamic across the 2D time/frequency plane of the post-FFT OFDM signal. In LTE-A FeICIC (further enhanced inter-cell interference coordination) scenarios, the interference may be scheduled differently for each physical resource block (PRB), hence the SIR pattern granularity may be as small as one PRB. (5.) synchronization errors (S): some of the frontend/AGC non-idealities such as carrier frequency offset, timing offset, and signal gain variations may also affect channel estimation.

It may thus be desirable to provide a new technique for improving channel estimation for fast adaptation to dynamic changes of conditions as described above, in particular, interference patterns (I) and, to some extent, synchronization errors (S).

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

FIG. 4a is a schematic diagram of a filter function 404 with respect to OFDM symbols 405 in a time-frequency representation 400a.

FIG. 4b is a diagram 400b representing SINR over filter tap of the filter function 404 illustrated in FIG. 4a.

FIG. 4c is a diagram 400c representing a scaling factor over filter tap of the filter function 404 illustrated in FIG. 4a.

DETAILED DESCRIPTION

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
CRS: Cell specific Reference Signal,
RE: Resource Element,
RB: Resource Block,
PRB: Physical Resource Block,
3GPP: 3rd Generation Partnership Project,
LTE: Long Term Evolution,
LTE-A: LTE Advanced, Release 10 and higher versions of 3GPP LTE,
RF: Radio Frequency,
UE: User Equipment,
SINR: signal-to-interference and noise ratio,
RB: resource block, e.g., a resource block in frequency direction times slot in time direction, OFDM: Orthogonal Frequency Division Multiplex,
NodeB: base station,
IRC: Interference Rejection Combining,
(e)ICIC: (enhanced) Inter-Cell Interference Coordination,
MIMO: Multiple Input Multiple Output,
CE: Channel Estimation,
CSI: Channel State Information.
FB: Feed-Back.
R: Reference signal
C: Channel coefficients
N: Noise
Interference
S: Synchronization The methods and devices described herein may be based on resource blocks, in particular resource blocks received from radio cells, and clusters. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as LTE, in particular LTE-A and/or OFDM. The methods and devices described below may further be implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G LTE, is a standard for wireless communication of high-speed data for mobile phones and data terminals.

The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

The methods and devices described hereinafter may be applied in multi-layer heterogeneous networks. Multi-layer heterogeneous networks (HetNet) may be used in LTE and LTE-Advanced standards to build up the network of not only a single type of eNodeB (homogeneous network), but to deploy eNodeBs with different capabilities, most importantly different Tx-power classes. These eNodeBs may commonly be referred to as macro eNodeBs or macro cells, pico eNodeBs or pico cells and femto/home eNodeBs or femto cells. Alternatively, the term "small cells" might be used as a broader term covering pico and femto cells.

The methods and devices described hereinafter may be applied in eICIC systems. ICIC based on Carrier Aggregation may enable an LTE-A UE to connect to several carriers simultaneously. It not only may allow resource allocation across carriers, it also may allow scheduler based fast switching between carriers without time consuming handover.

The methods and devices described hereinafter may be applied in interference aware receivers such as IRC (Interference Rejection Combining) receivers. IRC is a technique that may be used in an antenna diversity system to suppress co-channel interference by using the cross covariance between the noise in diversity channels. Interference rejection combining (IRC) may be used as an efficient alternative to increase uplink bit rates in areas where cells overlap. The interference rejection combining (IRC) receiver may be effective in improving the cell-edge user throughput because it may suppress inter-cell interference. The IRC receiver may be based on a minimum mean square error (MMSE) criterion, which may require channel estimation and covariance matrix estimation including the inter-cell interference with high accuracy.

The methods and devices described hereinafter may be applied in MIMO systems. Multiple-input multiple-output (MIMO) wireless communication systems employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band.

Figure 1:
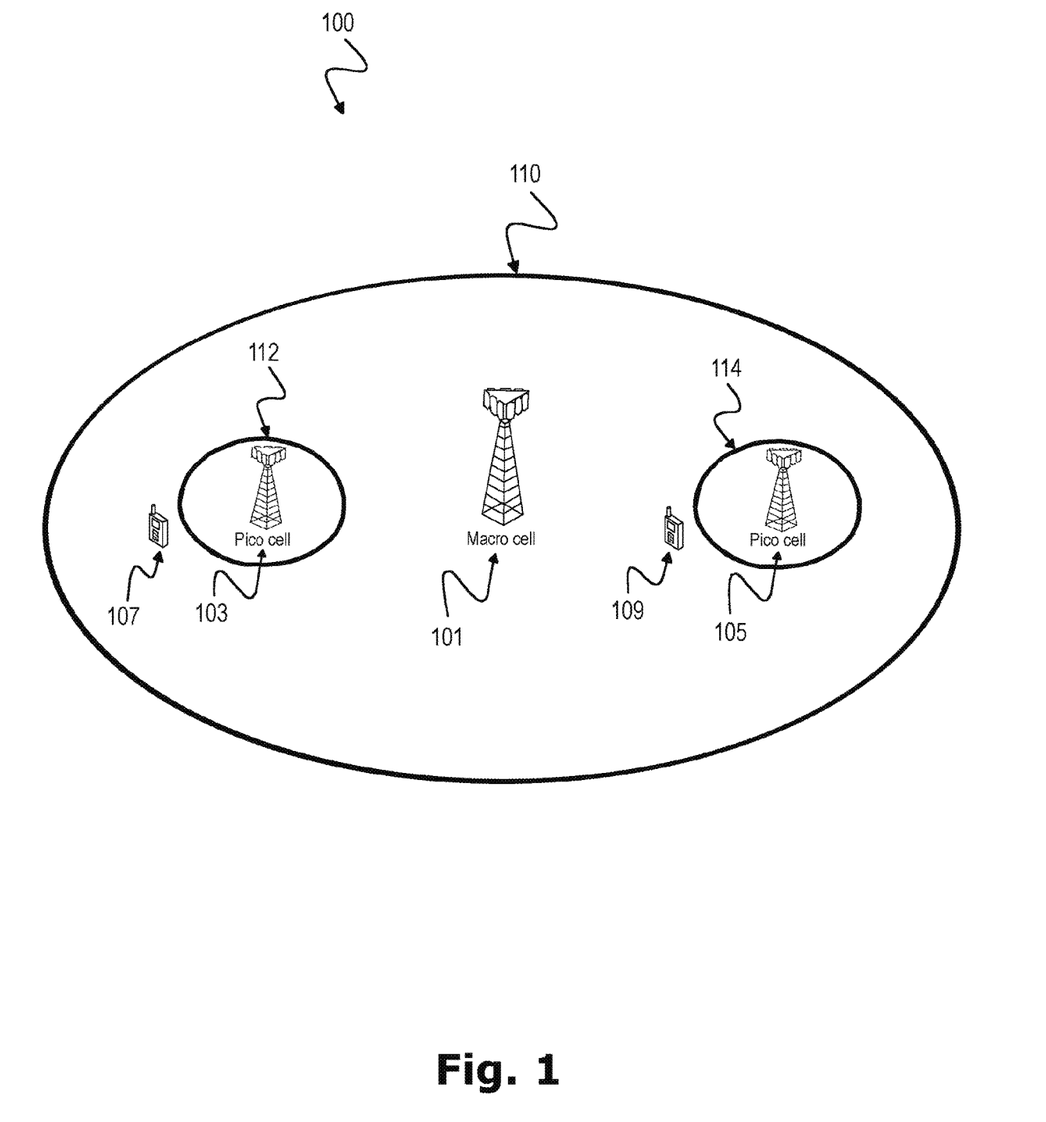
FIG. 1 is a schematic diagram of a heterogeneous network 100 including a macro cell 101 and pico cells 103, 105 according to an interference scenario.

FIG. 1 is a schematic diagram of a heterogeneous network 100 including a macro cell 101 and pico cells 103, 105. The pico base stations 103, 105 may be characterized by substantially lower transmit power as compared to the macro base station 101. Due to the large disparity between the transmit power levels among two type of base stations, the coverage 112, 114 of the pico base station 103, 105 is significantly limited than the coverage 110 of the macro base station 101 as shown in FIG. 1. The larger coverage 110 of the macro cells 101 may attract more users 107, 109 towards high power macro eNodeB although there might not be enough resources to efficiently serve all user terminals. At the same time, the resources of smaller power base station may remain underutilized.

The UEs 107, 109 may include methods and/or devices for generating channel estimation coefficients for channel estimation filtering as described in the following in order to improve channel estimation in such environments. Thus, channel estimation allows fast adaptation to dynamic changes for conditions as such as, for example, interference patterns and synchronization errors. Such channel estimation filtering may be adapted for OFDM-based systems such as LTE-Advanced, in the presence of various challenges and non-idealities such as time-/frequency selective channels, time/frequency-selective co-channel interference, symbol timing error, carrier frequency offset, and gain imbalances. Because some of these parameters can be very dynamic in both time- and frequency directions, UEs 107, 109 including methods and/or devices for generating channel estimation coefficients according to the disclosure are highly and quickly adaptive to such potentially highly selective channel conditions.

Figure 2:
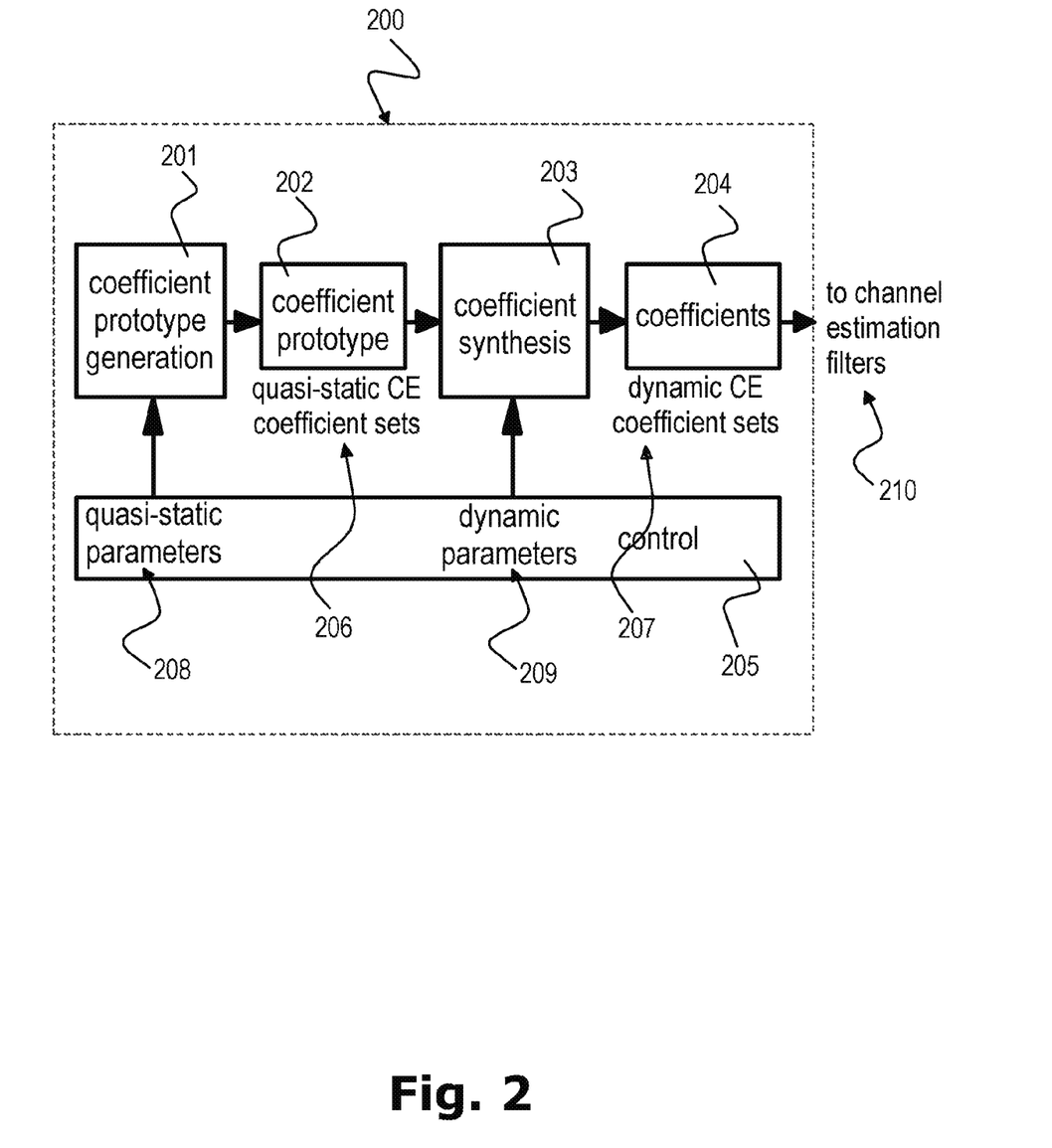
FIG. 2 is a block diagram of a channel estimation coefficients generator 200 for generating channel estimation coefficients for channel estimation filtering.

FIG. 2 is a block diagram of a channel estimation coefficients generator 200 for generating channel estimation coefficients for channel estimation filtering. The channel estimation coefficients generator 200 includes a parameter acquisition unit 205, a first channel estimation coefficients generator 201 and a second channel estimation coefficients generator 203.

The parameter acquisition unit 205 is configured to acquire a first set of input parameters 208, for example quasi-static parameters and to acquire a second set of input parameters 209, for example dynamic parameters that are different from the first set of input parameters 208. A time variability of the first set of input parameters 208 (e.g. quasi-static) is smaller than a time variability of the second set of input parameters 209 (e.g. dynamic). The first channel estimation coefficients generator 201 is configured to generate a prototype set of channel estimation coefficients 202, e.g. quasi-static CE coefficient sets 206 based on the first set of input parameters 208. The second channel estimation coefficients generator 203 is configured to generate a refined set of channel estimation coefficients 204, e.g. dynamic CE coefficient sets 207 based on the prototype set of channel estimation coefficients 202 and based on the second set of input parameters 209. The refined set of channel estimation coefficients 204 may be provided to channel estimation filters 210.

The time variability of the first set of input parameters 208 may be in accordance to a coherence time of a channel for which the channel estimation coefficients are generated. The time variability of the second set of input parameters 209 may be in accordance with the duration of a subframe of a data signal received over the channel, e.g. a subframe as defined according to 3GPP.

The first channel estimation coefficients generator 201 may be configured to generate the prototype set of channel estimation coefficients 202 if the first set of input parameters 208 has changed. The first channel estimation coefficients generator 201 may be configured to generate the prototype set of channel estimation coefficients 202 for a selectable subset of the first set of input parameters 208. The second channel estimation coefficients generator 203 may be configured to generate the refined set of channel estimation coefficients 204 if at least one input parameter of the second set of input parameters 209 crosses a threshold. The second channel estimation coefficients generator 203 may be configured to generate the refined set of channel estimation coefficients 204 on-demand.

The channel estimation coefficients generator 200 may include a switch (not depicted in FIG. 2) configured to switch between activating the second channel estimation coefficients generator 203 for generating the refined set of channel estimation coefficients 204 and deactivating the second channel estimation coefficients generator 203 for falling back to the prototype set of channel estimation coefficients 202.

The channel estimation coefficients generator 200 may include a processor (not depicted in FIG. 2) configured to compute the prototype set of channel estimation coefficients 202 based on online computation.

The channel estimation coefficients generator 200 may include a coefficient memory (not depicted in FIG. 2) for storing channel estimation coefficients; and a selector configured to select the prototype set of channel estimation coefficients 202 as a subset of the channel estimation coefficients stored in the coefficient memory.

The first set of input parameters 208 may include at least one reference signal, at least one physical channel parameter and at least one noise parameter. The reference signal may include a reference signal pattern in a time-frequency plane that is depending on at least one of the following parameters: a data communication standard, e.g. such as LTE, a transmission mode, a logical channel, a time configuration and a frequency configuration. The physical channel parameter may include at least one of the following parameters: a delay spread, a delay shift, a Doppler spread and a Doppler shift. The noise parameter may include at least one of a level of thermal noise and a level of background interference, e.g. as described below.

The second set of input parameters 209 may include at least one of a set of interference parameters and a set of synchronization error parameters. The second set of input parameters 209 may include at least one of the following parameters: a phase for frequency offset rotation, a phase for timing offset rotation, a gain level according to analog gain control, e.g. as described below.

In order to safeguard channel estimation against being overwhelmed by the ever-increasing requirements, the channel estimation coefficients generator 200 applies dynamic channel estimation coefficient synthesis that may essentially include two parts: (1) generation 201 of a semi-static CE coefficient prototype 202, based on parameters 208 which are slowly changing with time; and (2) computation 203 of dynamic CE coefficients 204, synthesized from the prototype (1), i.e. the semi-static CE coefficient prototype 202 as a function of parameters 209 which are changing dynamically with time.

Originally motivated by dynamic interference mitigation (I) and synchronization error compensation (S) on top of the quasi-static channel estimation tasks (R, C, N), the channel estimation coefficients generator 200 implements a more universal concept paving the way to many kinds of future extensions.

Channel estimation—as well as all other functions relying on it (detection, parameter estimation)—benefit from dynamic CE coefficient generation in many respects: Coefficient prototypes (1) 202 may be generated only occasionally, i.e., upon startup or when a quasi-static parameter (Reference Signal: R, Channel coefficients: C, Noise: N) 208 changes significantly. This avoids unnecessary computations and thus saves processing power.

Coefficient prototypes (1) 202 may be generated only for the subset of quasi-static parameters (R, C, N) 208 which are relevant for the foreseeable future, thus reducing the memory footprint to only a fraction of what would be required to store the whole set of coefficients for all potential combinations of reference signal configurations (transmission modes) and channel conditions (delay, Doppler, SNR).

Dynamic coefficients (2) 204 may be generated only when necessary, for example, when (i) interference is actually present and its (ii) SIR patterns are strongly dynamic within the span of CE filtering, or when (iii) synchronization errors (frequency/timing offsets, gain variations) are strong enough to merit their compensation through channel estimation filtering. This on-demand processing minimizes power consumption yet does not compromise performance.

Synthesis of dynamic coefficients (2) 204 from prototypes (1) 202 may be simplified in a systematic way, so as to approach near-optimal performance (optimal filtering) at the expense of little extra complexity.

Dynamic coefficient synthesis (2) 204 supports agile action on conditions which change fast (interference, sync error), thus alleviating other functions from taking dynamic action, e.g., frequency/timing synchronization or gain control.

The staggered architecture (1,2) 202, 204 of the channel estimation coefficients generator 200 implementing dynamic coefficient generation is backward-compatible with quasi-static channel estimation in the sense that it addresses both slowly changing environments and dynamic scenarios. Channel estimation may choose to fall back to using semi-static prototypes (1) 202 only and do without dynamic coefficients (2) 204.

The staggered architecture (1,2) 202, 204 of the channel estimation coefficients generator 200 is future-proof in the sense that it supports more dynamic and/or adding further channel estimation tasks in the future. In essence, the new staggered architecture widens the scope of channel estimation (aiding other functions), improves channel estimation performance in highly dynamic environments, greatly reduces memory requirements, and does all of that at minimal extra power consumption.

Figure 3:
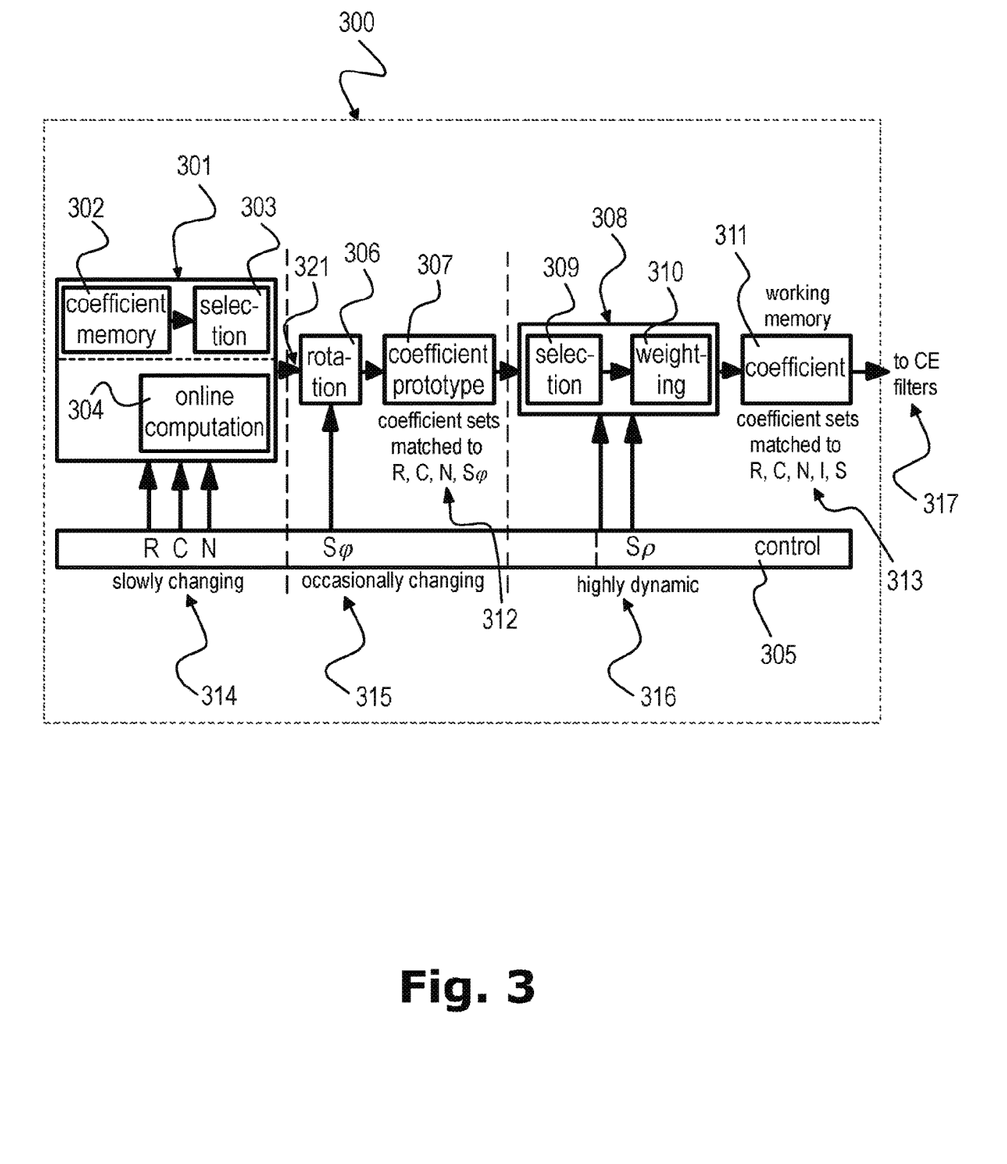
FIG. 3 is a block diagram of a channel estimation coefficients generator 300 for generating channel estimation coefficients for channel estimation filtering.

FIG. 3 is a block diagram of a channel estimation coefficients generator 300 for generating channel estimation coefficients for channel estimation filtering.

The channel estimation coefficients generator 300 includes a parameter acquisition unit 305, a first channel estimation coefficients generator 301, a second channel estimation coefficients generator 306 and a third channel estimation coefficients generator 308.

The parameter acquisition unit 305 is configured to acquire a first set of input parameters 314, a second set of input parameters 315 and a third set of input parameters 316. A time variability of the first set of input parameters 314 (e.g. slowly changing) is smaller than a time variability of the second set of input parameters 315 (e.g. occasionally changing) and a time variability of the second set of input parameters 315 (e.g. occasionally changing) is smaller than a time variability of the third set of input parameters 316 (e.g. highly dynamic).

The first channel estimation coefficients generator 301 is configured to generate a prototype set of channel estimation coefficients 321 based on the first set of input parameters 314. The second channel estimation coefficients generator 306 is configured to generate a refined set of channel estimation coefficients 307, e.g. coefficient sets 312 matched to R, C, N and $S_\varphi$ (phase synchronization) based on the prototype set of channel estimation coefficients 321 and based on the second set of input parameters 315. The third channel estimation coefficients generator 308 is configured to generate a further refined set of channel estimation coefficients 311, e.g. coefficient sets 313 matched to R, C, N, I and S or matched to R, C, N, $S_\varphi$ and $S_\rho$ (gain or level synchronization) based on the refined set of channel estimation coefficients 307 and based on the third set of input parameters 316.

The first channel estimation coefficients generator 301 may be configured to generate the prototype set of channel estimation coefficients 321 according to a minimum mean square error criterion with respect to a channel autocorrelation, a noise autocorrelation and a cross-correlation between a sequence of reference signal samples and a target resource element.

The second channel estimation coefficients generator 306 may be configured to generate the refined set of channel estimation coefficients 307 based on a Hadamard product of the prototype set of channel estimation coefficients and a conjugate of a rotation vector reflecting phase rotations along the sequence of reference signal samples, e.g. as described below.

The third channel estimation coefficients generator 308 may be configured to generate the further refined set of channel estimation coefficients 311 based on a Hadamard product of the refined set of channel estimation coefficients 307 and a signal to interference plus noise profile of a sample vector used for channel estimation filtering, e.g. as described below. The signal to interference plus noise profile of the sample vector may correspond to an instantaneous interference of the sample vector. The signal to interference plus noise profile of the sample vector may include interfered OFDM taps and non-interfered OFDM taps, wherein the interfered OFDM taps are suppressed and the non-interfered OFDM taps are rescaled, e.g. as described below.

The further refined set of channel estimation coefficients 311 may be provided to channel estimation filtering 317.

Depending on processing capabilities and development targets, the parameter space may be first partitioned into (semi-)static and dynamic, respectively, e.g. as described above for the channel estimation coefficients generator 200 with respect to FIG. 2. The divide may be anywhere between "all static" (prototype=final coefficients) to the other extreme "all dynamic" (coefficients generated afresh for each resource block). For the channel estimation coefficients generator 300 depicted in FIG. 3, the divide is somewhere in between where the reference signal (R), channel (C), noise (N), and some synchronization parameters (e.g., phases $S_\varphi$ for frequency/timing offset (de)rotation) are (semi-)static, while interference (I) and other synch parameters (e.g., varying levels $S_\rho$ due to AGC) are dynamic. Note that this divide may vary, for instance, TM10 dynamic transmission points and their frequency/timing offsets may change per subframe, hence, phase rotation ($S_\varphi$) would not be associated with the prototype but with dynamic coefficient generation. TM10 describes a transmission mode for which one subframe is transmitted by one antenna, the next subframe is transmitted by another antenna. During TM10 transmission the synchronization parameters are changing. Using channel estimation may be an appropriate reaction to such change of synchronization parameters.

Figure 4:
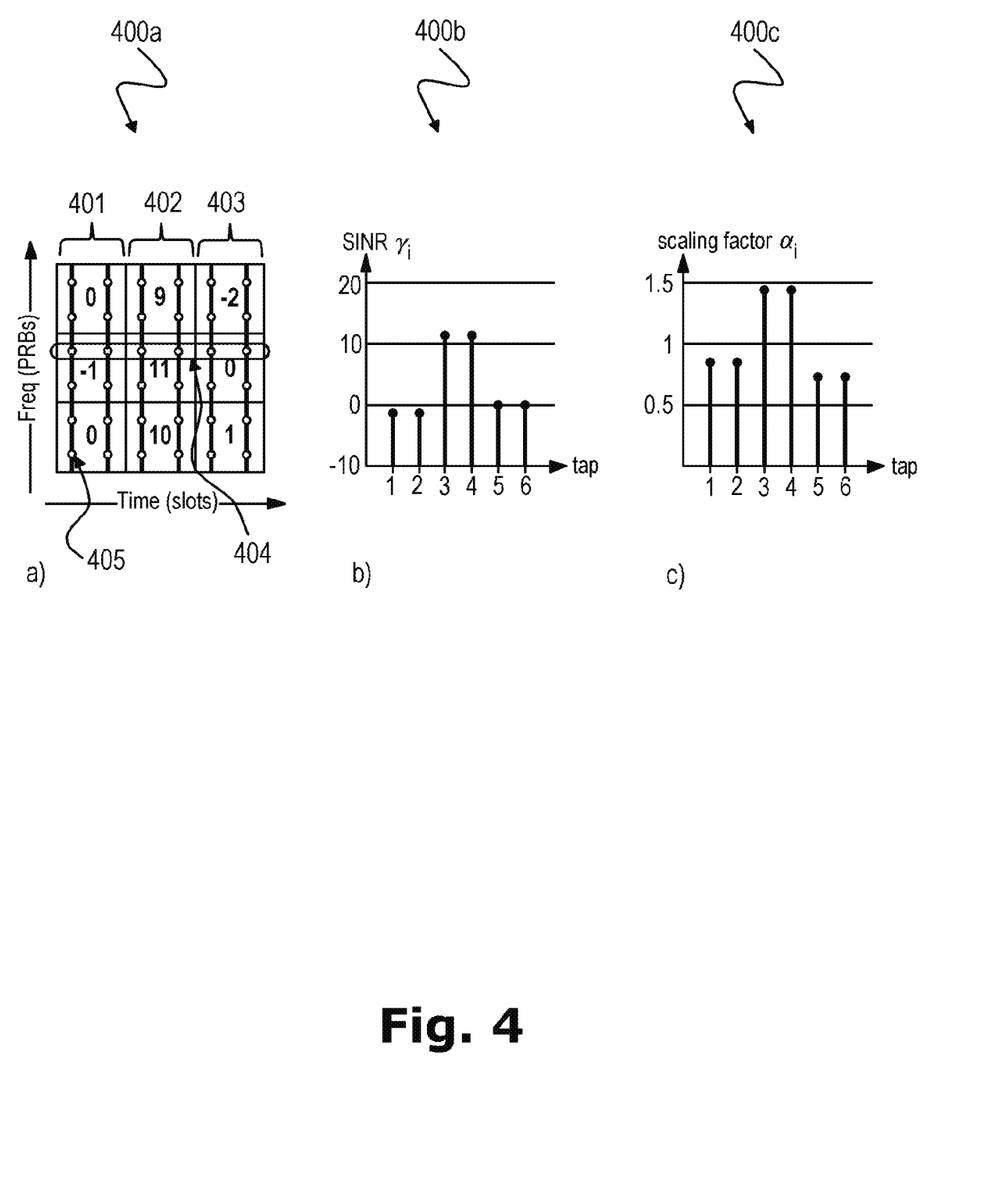

$S_\rho$ may be set in order to adjust for different levels of analog gain control AGC to compensate for amplitude errors. Depending on experienced interference and/or noise, the AGC may set a gain factor at different values. By using $S_\rho$ such different gains may be compensated, e.g. as described below with respect to FIG. 4.

$S_\varphi$ may be set in order to adjust for different phase levels in frequency domain, e.g. due to synchronization in time domain in order to compensate timing errors. $S_\varphi$ may further be set in order to adjust for different phase levels in time domain, e.g. due to frequency shifts caused by Doppler effects in order to compensate Doppler shifts. A shift in time domain, e.g. by synchronization errors, is translated into a rotation in frequency domain that can be compensated by a de-rotation $S_\varphi$ in frequency domain. A rotation in frequency domain, e.g. due to Doppler effects, can be compensated by a de-rotation $S_\varphi$ in frequency domain.

In one embodiment, the prototype coefficients 321 are selected from a large non-volatile coefficient repository 302, e.g. by a selector 303. In a second (alternative) embodiment, the prototype coefficients 321 are computed online 304. In another embodiment, the prototype coefficients are generated in a step-wise manner, e.g. as described below. All of these methods may (re)generate the prototype coefficients 321 on demand, e.g., upon initialization and whenever a (semi-static) parameter has changed (or is about to change) significantly. The generation of prototype coefficients 321 may be triggered by channel estimation control, based on the amount and stability of parameter change.

To illustrate prototype generation, a first prototype 321 (selected 303 from memory 302 or computed online 304) may be generated, e.g., according to the MMSE (minimum mean-square error) criterion based on a first subset of parameters (R, C, N) 314 as $$w_{prot}^{(1)} = (R_{hh} + R_{zz})^{-1} r_{th} \quad \text{(Eq. 1)}$$

where $R_{hh} = E[h^*h^T]$ and $R_{zz}$ denote the channel and noise autocorrelation matrices, respectively, and $r_{th} = E[h_t h^*]$ denotes the cross-correlation between RS samples and the target RE.

Based on the $2^{nd}$ subset of parameters 315 (in this example timing/frequency phases $S_\varphi$), the second (final) prototype 307

$$w_{prot} = w_{prot}^{(1)} \cdot \omega_{S\varphi}^* \quad \text{(Eq. 2)}$$

may be computed as the Hadamard product of the first prototype 321 and the conjugate of rotation vector $\omega_{S\varphi}$ reflecting the phase rotations along the RS samples. The asterisk * denotes a derotation of the rotation vector (phasor) $\omega_{S\varphi}$.

Among the many possibilities for dynamic CE coefficient computation, the third channel coefficients generator 308 may implement simple solutions. One embodiment of CE coefficient synthesis by the third channel coefficients generator 308 consists in weighting 310 the prototype 307 (Eq. 2) by a scaling vector $$w_{synth} = \alpha \cdot w_{prot} \quad \text{(Eq. 3)}$$

where $\alpha(\gamma)$ is a function of the instantaneous interference or SINR profile $\gamma$ of the sample vector used for CE filtering.

For instance, the filter tap scaling factors (derived by considering the diagonal elements of $R_{hh}$ and minimizing the MSE) may be defined as $$\alpha_n = \frac{1 + 1/\gamma_{max}}{1 + 1/\gamma_n} \quad \text{(Eq. 4a)}$$

with $\gamma_{max}$ denoting the maximum SINR within the span of filter or alternatively as $$\alpha_n = \frac{\rho_n}{\bar{\rho}} \text{ with } \rho_n = \frac{\gamma_n}{1 + \gamma_n} \text{ and } \bar{\rho} = \frac{1}{N} \sum_{n=1}^{N} \rho_n. \quad \text{(Eq. 4b)}$$

Both Equations 4a and 4b are simple functions of tap SINRs effectuating the suppression of interfered taps (Eq. 4a) and, in addition, rescaling of non-interfered taps (Eq. 4b).

FIG. 4a is a schematic diagram of a filter function 404 with respect to OFDM symbols 405 in a time-frequency representation 400a. FIG. 4b is a diagram 400b representing SINR over filter tap of the filter function 404 illustrated in FIG. 4a. FIG. 4c is a diagram 400c representing a scaling factor over filter tap of the filter function 404 illustrated in FIG. 4a.

FIG. 4a illustrates prototype scaling according to Eq. 4b for an exemplary 6-tap time filtering (targeting the center slot) over three consecutive slots with varying SINR. The filter function 404 evaluates six OFDM symbols carrying reference symbols over three consecutive slots 401, 402, 403 at a specific frequency. The first two OFDM symbols are related to a first slot 401 for which an SINR has the value −1 dB; the second two OFDM symbols are related to a second slot 402 for which the SINR has the value 11 dB; the third two OFDM symbols are related to a third slot 403 for which the SINR has the value 0 dB. FIG. 4b illustrates these six OFDM symbols as taps and their corresponding tap SINR values $\gamma_n$.

For the third two OFDM symbols for which the SINR has a value of 0 dB, an interferer may be as strong as the wanted signal. The difference between the border taps 1, 2, 5, 6 and the center taps 4, 5 may be caused by an automatic gain control (AGC). For example, at the border taps 1, 2, 5, 6 AGC may be set to an exemplary value of 0.8 while at the center taps 3, 4 AGC may be set to an exemplary value of 1.

FIG. 4c illustrates calculation of the scaling factor $\alpha_n$ according to Equation 4a (not depicted in FIG. 4c) or alternatively according to Equation 4b (depicted in FIG. 4c). Both Equations 4a and 4b are simple functions of the tap SINRs $\gamma_n$ effectuating the suppression of interfered taps (Equation 4a), in this example of the border taps 1, 2, 5, 6 and, in addition, rescaling of non-interfered taps (Equation 4b), in this example of the center taps 3, 4.

Figure 5A:
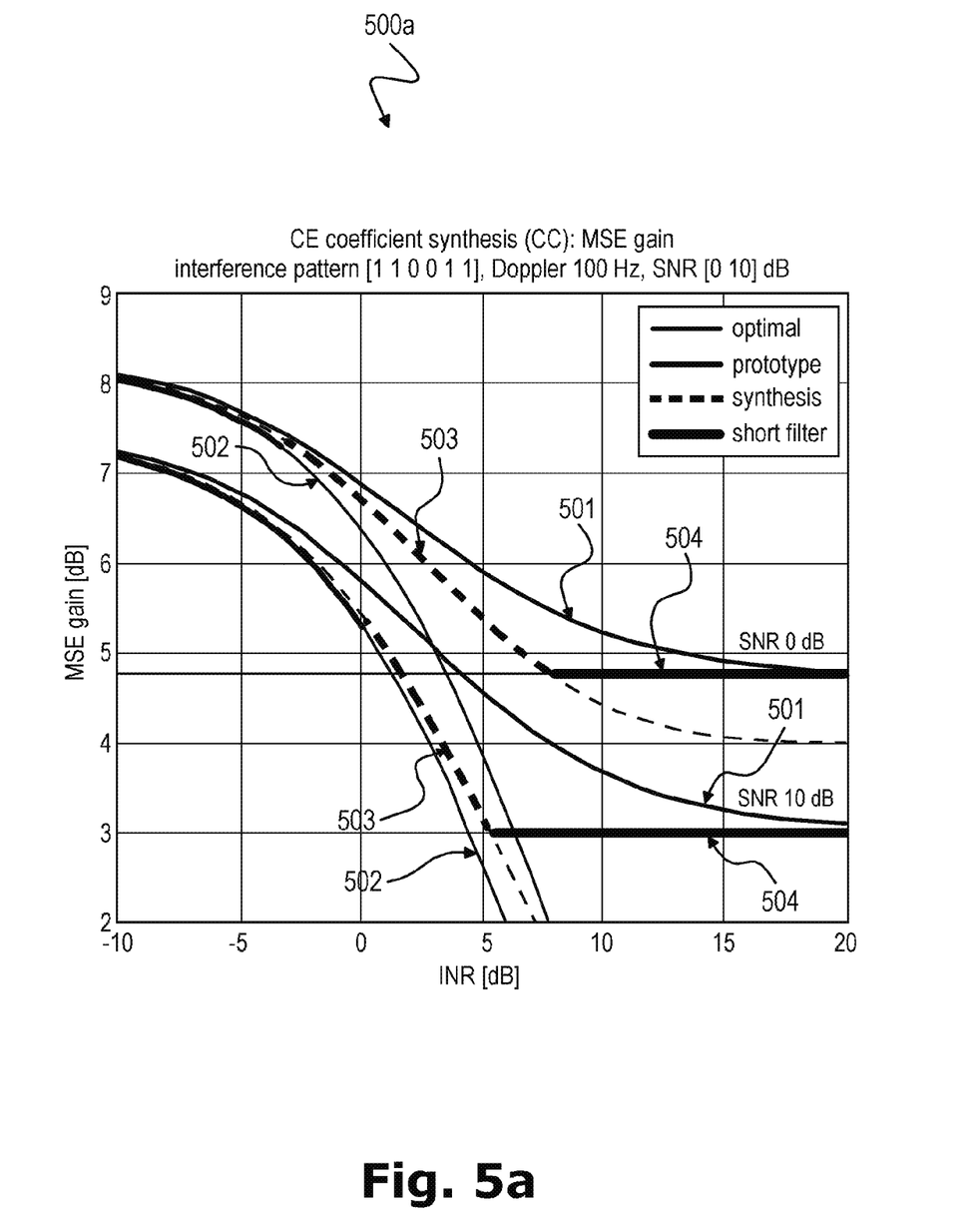
FIG. 5a is a performance diagram illustrating mean square error 500a of dynamic channel estimation according to the disclosure.
Figure 5B:
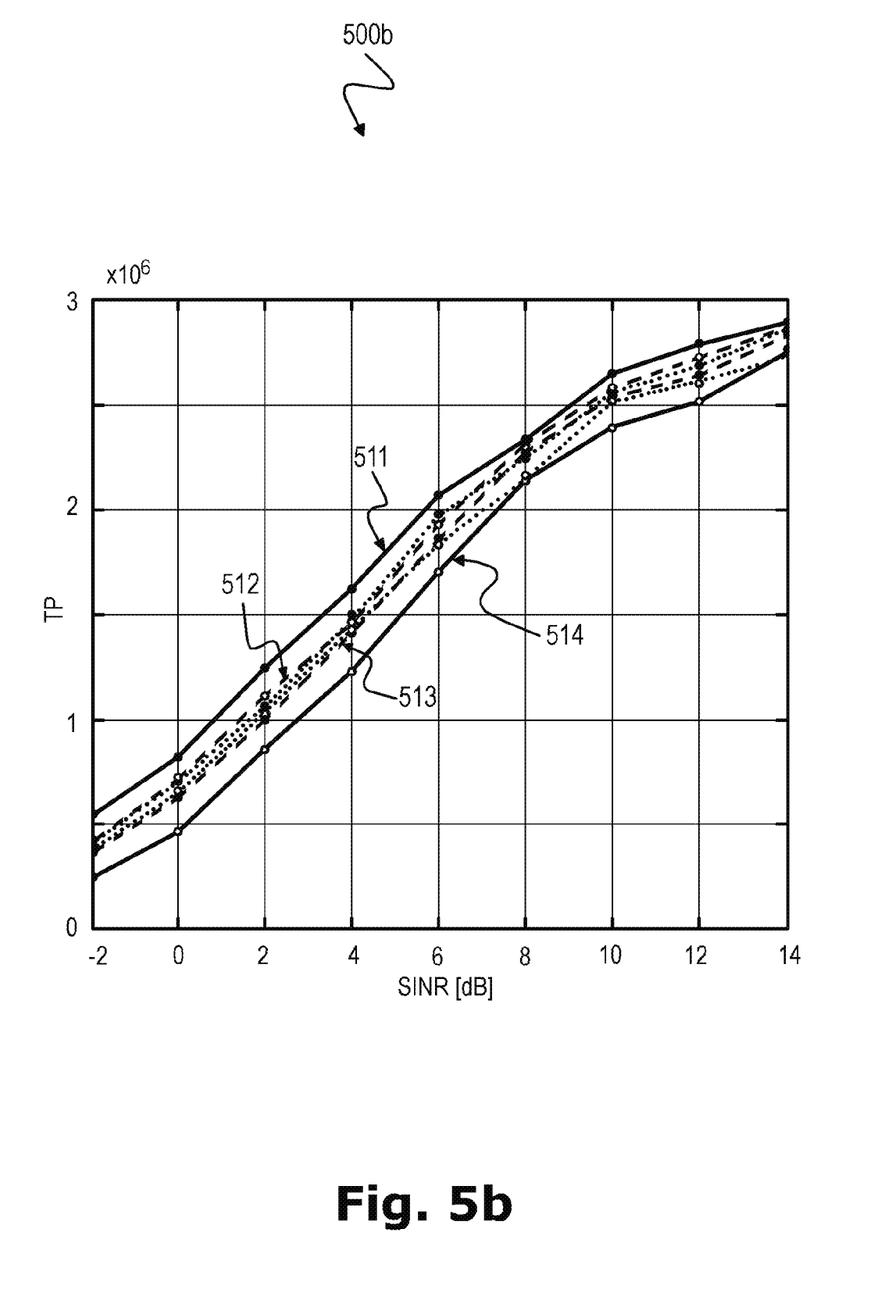
FIG. 5b is a performance diagram illustrating throughput (TP) 500b of dynamic channel estimation according to the disclosure.

FIG. 5a is a performance diagram illustrating mean square error 500a of dynamic channel estimation according to the disclosure. FIG. 5b is a performance diagram illustrating throughput (TP) 500b of dynamic channel estimation according to the disclosure. Both figures validate the MSE and throughput performance of dynamic coefficient synthesis 503 versus optimal (but complex) Wiener filtering 501, prototype filtering (MSE: 502), and short filtering 504 circumventing interfered taps altogether.

The optimal curve 501 may be determined by solving the Wiener filtering online to have a reference for the other curves 502, 503, 504.

Coefficient synthesis 503 is seen to improve MSE performance particularly in the interesting INR region near 0 dB. For very low INR, the prototype 502 should be used, and for very high INR, short filtering 504 is appropriate. This suggests the following coefficient selection procedure:

$$\text{coefficient set} = \begin{cases} \text{prototype (Eq2)} & INR < \vartheta_1 \\ \text{synthesis (Eq3)} & \vartheta_1 \leq INR \leq \vartheta_2 \\ \text{short prototype} & INR > \vartheta_2 \end{cases} \quad \text{(Eq. 5)}$$

where the thresholds $\vartheta_1$ and $\vartheta_2$ are functions of the SNR and INR.

FIG. 5b illustrates the throughput achievable with perfect channel estimation 511 and different kinds of prototype filtering 512, 513, 514. The highest throughput is obtained for the perfect channel estimation 511, the second-highest throughput is reached when using optimal (but complex) Wiener filtering 512, the third-highest throughput is obtained when applying dynamic coefficient synthesis 513 and the lowest throughput is obtained when using short filtering 514. The throughput of dynamic coefficient synthesis 513 is close to the throughput of optimal Wiener filtering 512 and much higher than the throughput of short filtering 514.

Figure 6:
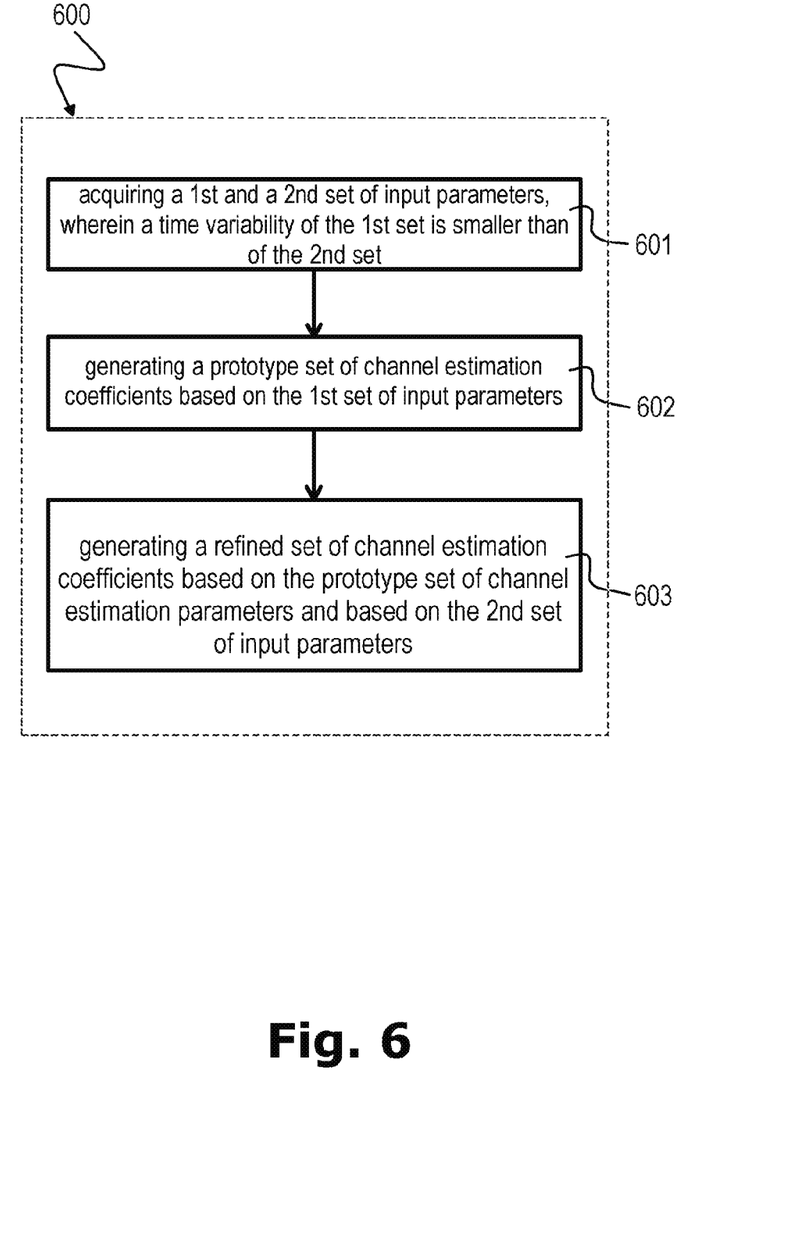
FIG. 6 is a schematic diagram of a method 600 for generating channel estimation coefficients for channel estimation filtering.

FIG. 6 is a schematic diagram of a method 600 for generating channel estimation coefficients for channel estimation filtering. The method 600 includes acquiring 601 a first set of input parameters and a second set of input parameters, wherein a time variability of the first set of input parameters is smaller than a time variability of the second set of input parameters, e.g. as described above with respect to FIG. 2. The method 600 includes generating 602 a prototype set of channel estimation coefficients based on the first set of input parameters. The method 600 includes generating 603 a refined set of channel estimation coefficients based on the prototype set of channel estimation coefficients and based on the second set of input parameters.

The method 600 may further include generating the prototype set of channel estimation coefficients if the first set of input parameters has changed; and generating the refined set of channel estimation coefficients if at least one input parameter of the second set of input parameters crosses a threshold.

The method 600 may further include generating the prototype set of channel estimation coefficients for a selectable subset of the first set of input parameters.

The method 600 may also include generating a further refined set of channel estimation coefficients based on the refined set of channel estimation coefficients and based on the third set of input parameters, e.g. as described above with respect to FIG. 3.

The methods, systems and devices described herein may be implemented as software in a Digital Signal Processor (DSP), in a micro-controller or in any other side-processor or as hardware circuit on a chip or within an application specific integrated circuit (ASIC).

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 600 as described above with respect to FIG. 6. Such a computer program product may include a readable storage medium storing program code thereon for use by a processor, the program code comprising instructions for performing any of the method 600 as described above.

EXAMPLES

The following examples pertain to further embodiments. Example 1 is a channel estimation coefficients generator for generating channel estimation coefficients for channel estimation filtering, comprising: a parameter acquisition unit configured to acquire a first set of input parameters and to acquire a second set of input parameters, wherein a time variability of the first set of input parameters is smaller than a time variability of the second set of input parameters; a first channel estimation coefficients generator configured to generate a prototype set of channel estimation coefficients based on the first set of input parameters; and a second channel estimation coefficients generator configured to generate a refined set of channel estimation coefficients based on the prototype set of channel estimation coefficients and based on the second set of input parameters.

In Example 2, the subject matter of Example 1 can optionally include that the time variability of the first set of input parameters is in accordance to a coherence time of a channel for which the channel estimation coefficients are generated.

In Example 3, the subject matter of Example 2 can optionally include that the time variability of the second set of input parameters is in accordance to a duration of a subframe of a data signal received over the channel.

In Example 4, the subject matter of any one of Examples 1-3 can optionally include that the first channel estimation coefficients generator is configured to generate the prototype set of channel estimation coefficients if the first set of input parameters has changed.

In Example 5, the subject matter of any one of Examples 1-4 can optionally include that the first channel estimation coefficients generator is configured to generate the prototype set of channel estimation coefficients for a selectable subset of the first set of input parameters.

In Example 6, the subject matter of any one of Examples 1-5 can optionally include that the second channel estimation coefficients generator is configured to generate the refined set of channel estimation coefficients if at least one input parameter of the second set of input parameters crosses a threshold.

In Example 7, the subject matter of any one of Examples 1-6 can optionally include that the second channel estimation coefficients generator is configured to generate the refined set of channel estimation coefficients on-demand.

In Example 8, the subject matter of any one of Examples 1-7 can optionally include a switch configured to switch between activating the second channel estimation coefficients generator for generating the refined set of channel estimation coefficients and deactivating the second channel estimation coefficients generator for falling back to the prototype set of channel estimation coefficients.

In Example 9, the subject matter of any one of Examples 1-8 can optionally include a processor configured to compute the prototype set of channel estimation coefficients based on online computation.

In Example 10, the subject matter of any one of Examples 1-8 can optionally include a coefficient memory for storing channel estimation coefficients; and a selector configured to select the prototype set of channel estimation coefficients as a subset of the channel estimation coefficients stored in the coefficient memory.

In Example 11, the subject matter of any one of Examples 1-10 can optionally include that the first set of input parameters comprises at least one reference signal, at least one physical channel parameter and at least one noise parameter.

In Example 12, the subject matter of Example 11 can optionally include that the at least one reference signal comprises a reference signal pattern in a time-frequency plane that is depending on at least one of the following parameters: a data communication standard, a transmission mode, a logical channel, a time configuration and a frequency configuration.

In Example 13, the subject matter of Example 11 or Example 12 can optionally include that the at least one physical channel parameter comprises at least one of the following parameters: a delay spread, a delay shift, a Doppler spread and a Doppler shift.

In Example 14, the subject matter of any one of Examples 11-13 can optionally include that the at least one noise parameter comprises at least one of a level of thermal noise and a level of background interference.

In Example 15, the subject matter of any one of Examples 1-14 can optionally include that the second set of input parameters comprises at least one of a set of interference parameters and a set of synchronization error parameters.

In Example 16, the subject matter of any one of Examples 1-15 can optionally include that the second set of input parameters comprises at least one of the following parameters: a phase for frequency offset rotation, a phase for timing offset rotation, a gain level according to analog gain control.

Example 17 is a channel estimation coefficients generator for generating channel estimation coefficients for channel estimation filtering in OFDM centric systems, comprising: a parameter acquisition unit configured to acquire a first set of input parameters, a second set of input parameters and a third set of input parameters, wherein a time variability of the first set of input parameters is smaller than a time variability of the second set of input parameters and a time variability of the second set of input parameters is smaller than a time variability of the third set of input parameters; a first channel estimation coefficients generator configured to generate a prototype set of channel estimation coefficients based on the first set of input parameters; a second channel estimation coefficients generator configured to generate a first refined set of channel estimation coefficients based on the prototype set of channel estimation coefficients and based on the second set of input parameters; and a third channel estimation coefficients generator configured to generate a second refined set of channel estimation coefficients based on the first refined set of channel estimation coefficients and based on the third set of input parameters.

In Example 18, the subject matter of Example 17 can optionally include that the first channel estimation coefficients generator is configured to generate the prototype set of channel estimation coefficients according to a minimum mean square error criterion with respect to a channel autocorrelation, a noise autocorrelation and a cross-correlation between a sequence of reference signal samples and a target resource element.

In Example 19, the subject matter of any one of Examples 17-18 can optionally include that the second channel estimation coefficients generator is configured to generate the first refined set of channel estimation coefficients based on a Hadamard product of the prototype set of channel estimation coefficients and a conjugate of a rotation vector reflecting phase rotations along the sequence of reference signal samples.

In Example 20, the subject matter of any one of Examples 17-19 can optionally include that the third channel estimation coefficients generator is configured to generate the second refined set of channel estimation coefficients based on a Hadamard product of the first refined set of channel estimation coefficients and a signal to interference plus noise profile of a sample vector used for channel estimation filtering.

In Example 21, the subject matter of Example 20 can optionally include that the signal to interference plus noise profile of the sample vector corresponds to an instantaneous interference of the sample vector.

In Example 22, the subject matter of any one of Examples 20-21 can optionally include that the signal to interference plus noise profile of the sample vector comprises interfered OFDM taps and non-interfered OFDM taps, wherein the interfered OFDM taps are suppressed and the non-interfered OFDM taps are rescaled.

Example 23 is a method for generating channel estimation coefficients for channel estimation filtering, the method comprising: acquiring a first set of input parameters and a second set of input parameters, wherein a time variability of the first set of input parameters is smaller than a time variability of the second set of input parameters; generating a prototype set of channel estimation coefficients based on the first set of input parameters; and generating a refined set of channel estimation coefficients based on the prototype set of channel estimation coefficients and based on the second set of input parameters.

In Example 24, the subject matter of Example 23 can optionally include: generating the prototype set of channel estimation coefficients if the first set of input parameters has changed; and generating the refined set of channel estimation coefficients if at least one input parameter of the second set of input parameters crosses a threshold.

In Example 25, the subject matter of any one of Examples 23-24 can optionally include generating the prototype set of channel estimation coefficients for a selectable subset of the first set of input parameters.

Example 26 is a computer readable medium on which computer instructions are stored which when executed by a computer, cause the computer to perform the method of any one of Examples 23 to 25.

Example 27 is a channel estimation coefficients generation system for generating channel estimation coefficients for channel estimation filtering in OFDM centric systems, comprising: a parameter acquisition unit configured to acquire a first set of input parameters, a second set of input parameters and a third set of input parameters, wherein a time variability of the first set of input parameters is smaller than a time variability of the second set of input parameters and a time variability of the second set of input parameters is smaller than a time variability of the third set of input parameters; a first channel estimation coefficients generator configured to generate a prototype set of channel estimation coefficients based on the first set of input parameters; a second channel estimation coefficients generator configured to generate a first refined set of channel estimation coefficients based on the prototype set of channel estimation coefficients and based on the second set of input parameters; and a third channel estimation coefficients generator configured to generate a second refined set of channel estimation coefficients based on the first refined set of channel estimation coefficients and based on the third set of input parameters.

In Example 28, the subject matter of Example 27 can optionally include that the first channel estimation coefficients generator is configured to generate the prototype set of channel estimation coefficients according to a minimum mean square error criterion with respect to a channel autocorrelation, a noise autocorrelation and a cross-correlation between a sequence of reference signal samples and a target resource element.

In Example 29, the subject matter of any one of Examples 27-28 can optionally include that the second channel estimation coefficients generator is configured to generate the first refined set of channel estimation coefficients based on a Hadamard product of the prototype set of channel estimation coefficients and a conjugate of a rotation vector reflecting phase rotations along the sequence of reference signal samples.

In Example 30, the subject matter of any one of Examples 27-29 can optionally include that the third channel estimation coefficients generator is configured to generate the second refined set of channel estimation coefficients based on a Hadamard product of the first refined set of channel estimation coefficients and a signal to interference plus noise profile of a sample vector used for channel estimation filtering.

In Example 31, the subject matter of Example 30 can optionally include that the signal to interference plus noise profile of the sample vector corresponds to an instantaneous interference of the sample vector.

In Example 32, the subject matter of any one of Examples 30-31 can optionally include that the signal to interference plus noise profile of the sample vector comprises interfered OFDM taps and non-interfered OFDM taps, wherein the interfered OFDM taps are suppressed and the non-interfered OFDM taps are rescaled.

In Example 33, the subject matter of any one of Examples 27-32 can optionally include that the channel estimation coefficients generation system is an on-chip system.

Example 34 is a channel estimation coefficients generator for generating channel estimation coefficients for channel estimation filtering, comprising: means for acquiring a first set of input parameters and for acquiring a second set of input parameters, wherein a time variability of the first set of input parameters is smaller than a time variability of the second set of input parameters; means for generating a prototype set of channel estimation coefficients based on the first set of input parameters; and means for generating a refined set of channel estimation coefficients based on the prototype set of channel estimation coefficients and based on the second set of input parameters.

In Example 35, the subject matter of Example 34 can optionally include that the time variability of the first set of input parameters is in accordance to a coherence time of a channel for which the channel estimation coefficients are generated.

In Example 36, the subject matter of Example 35 can optionally include that the time variability of the second set of input parameters is in accordance to a duration of a subframe of a data signal received over the channel.

In Example 37, the subject matter of any one of Examples 34-36 can optionally include that the means for generating a prototype set of channel estimation coefficients is configured to generate the prototype set of channel estimation coefficients if the first set of input parameters has changed.

In Example 38, the subject matter of any one of Examples 34-37 can optionally include that the means for generating a prototype set of channel estimation coefficients is configured to generate the prototype set of channel estimation coefficients for a selectable subset of the first set of input parameters.

In Example 39, the subject matter of any one of Examples 34-38 can optionally include that the means for generating a refined set of channel estimation coefficients is configured to generate the refined set of channel estimation coefficients if at least one input parameter of the second set of input parameters crosses a threshold.

In Example 40, the subject matter of any one of Examples 34-39 can optionally include that the means for generating a refined set of channel estimation coefficients is configured to generate the refined set of channel estimation coefficients on-demand.

In Example 41, the subject matter of any one of Examples 34-40 can optionally include switching means for switching between activating the means for generating a refined set of channel estimation coefficients for generating the refined set of channel estimation coefficients and deactivating the means for generating a refined set of channel estimation coefficients for falling back to the prototype set of channel estimation coefficients.

In Example 42, the subject matter of any one of Examples 34-41 can optionally include means for computing the prototype set of channel estimation coefficients based on online computation.

In Example 43, the subject matter of any one of Examples 34-42 can optionally include means for storing channel estimation coefficients; and selecting means for selecting the prototype set of channel estimation coefficients as a subset of the channel estimation coefficients stored in the means for storing channel estimation coefficients.

In Example 44, the subject matter of any one of Examples 34-43 can optionally include that the first set of input parameters comprises at least one reference signal, at least one physical channel parameter and at least one noise parameter.

In Example 45, the subject matter of Example 44 can optionally include that the at least one reference signal comprises a reference signal pattern in a time-frequency plane that is depending on at least one of the following parameters: a data communication standard, a transmission mode, a logical channel, a time configuration and a frequency configuration.

In Example 46, the subject matter of Example 44 or Example 45 can optionally include that the at least one physical channel parameter comprises at least one of the following parameters: a delay spread, a delay shift, a Doppler spread and a Doppler shift.

In Example 47, the subject matter of any one of Examples 44-46 can optionally include that the at least one noise parameter comprises at least one of a level of thermal noise and a level of background interference.

In Example 48, the subject matter of any one of Examples 34-47 can optionally include that the second set of input parameters comprises at least one of a set of interference parameters and a set of synchronization error parameters.

In Example 49, the subject matter of any one of Examples 34-48 can optionally include that the second set of input parameters comprises at least one of the following parameters: a phase for frequency offset rotation, a phase for timing offset rotation, a gain level according to analog gain control.

In Example 50, the subject matter of any one of Examples 34-49 can optionally include that the means for generating a prototype set of channel estimation coefficients is configured to generate the prototype set of channel estimation coefficients according to a minimum mean square error criterion with respect to a channel autocorrelation, a noise autocorrelation and a cross-correlation between a sequence of reference signal samples and a target resource element.

In Example 51, the subject matter of any one of Examples 34-50 can optionally include that the means for generating a refined set of channel estimation coefficients is configured to generate the refined set of channel estimation coefficients based on a Hadamard product of the prototype set of channel estimation coefficients and a conjugate of a rotation vector reflecting phase rotations along the sequence of reference signal samples.

In Example 52, the subject matter of any one of Examples 34-51 can optionally include that the means for generating a refined set of channel estimation coefficients is configured to generate the refined set of channel estimation coefficients based on a Hadamard product of the prototype set of channel estimation coefficients and a conjugate of a rotation vector reflecting phase rotations along the sequence of reference signal samples and a signal to interference plus noise profile of a sample vector used for channel estimation filtering.

In Example 53, the subject matter of Example 52 can optionally include that the signal to interference plus noise profile of the sample vector corresponds to an instantaneous interference of the sample vector.

In Example 54, the subject matter of any one of Examples 52-53 can optionally include that the signal to interference plus noise profile of the sample vector comprises interfered OFDM taps and non-interfered OFDM taps, wherein the interfered OFDM taps are suppressed and the non-interfered OFDM taps are rescaled.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A channel estimation coefficients generator for generating channel estimation coefficients for channel estimation filtering, comprising:
   a parameter acquisition unit comprising one or more processors configured to acquire a first set of input parameters and to acquire a second set of input parameters,
   wherein parameters of the first set of input parameters remain approximately unchanged over a first period of time and parameters of the second set of input parameters remain approximately unchanged over a second period of time that is shorter than the first a period of time;
   a first channel estimation coefficients generator comprising one or more processors configured to generate a first set of channel estimation coefficients based on the first set of input parameters; and
   a second channel estimation coefficients generator comprising one or more processors configured to generate a second set of channel estimation coefficients based on the first set of channel estimation coefficients and based on the second set of input parameters.

2. The channel estimation coefficients generator of claim 1,
   wherein a time variability of the first set of input parameters is based on a coherence time of a channel for which the channel estimation coefficients are generated.

3. The channel estimation coefficients generator of claim 2,
   wherein a time variability of the second set of input parameters is based on a duration of a subframe of a data signal received over the channel.

4. The channel estimation coefficients generator of claim 1,
   wherein the first channel estimation coefficients generator is configured to generate the first set of channel estimation coefficients if the first set of input parameters has changed.

5. The channel estimation coefficients generator of claim 1,
   wherein the first channel estimation coefficients generator is configured to generate the first set of channel estimation coefficients for a selectable subset of the first set of input parameters.

6. The channel estimation coefficients generator of claim 1,
   wherein the second channel estimation coefficients generator is configured to generate the second set of channel estimation coefficients if at least one input parameter of the second set of input parameters crosses a threshold.

7. The channel estimation coefficients generator of claim 1,
   wherein the second channel estimation coefficients generator is configured to generate the second set of channel estimation coefficients on-demand.

8. The channel estimation coefficients generator of claim 1, comprising:
   a switch configured to switch between activating the second channel estimation coefficients generator for generating the second set of channel estimation coefficients and deactivating the second channel estimation coefficients generator for falling back to the first set of channel estimation coefficients.

9. The channel estimation coefficients generator of claim 1,
   wherein coefficients of the second set of channel estimation coefficients remain approximately unchanged over a first number of coefficients and coefficients of the first set of channel estimation coefficients remains approximately unchanged over a second number of coefficients that is greater than the first a number of coefficients, and the second channel estimation coefficient generator provides the second set of channel estimation coefficients to a filter.

10. The channel estimation coefficients generator of claim 1, comprising:
    a coefficient memory for storing channel estimation coefficients; and
    a selector configured to select the first set of channel estimation coefficients as a subset of the channel estimation coefficients stored in the coefficient memory.

11. The channel estimation coefficients generator of claim 1,
    wherein the first set of input parameters comprises at least one reference signal, at least one physical channel parameter and at least one noise parameter.

12. The channel estimation coefficients generator of claim 11,
    wherein the at least one reference signal comprises a reference signal pattern in a time-frequency plane that is depending on at least one of the following parameters: a data communication standard, a transmission mode, a logical channel, a time configuration and a frequency configuration.

13. The channel estimation coefficients generator of claim 11,
    wherein the at least one physical channel parameter comprises at least one of the following parameters: a delay spread, a delay shift, a Doppler spread and a Doppler shift.

14. The channel estimation coefficients generator of claim 11,
    wherein the at least one noise parameter comprises at least one of a level of thermal noise and a level of background interference.

15. The channel estimation coefficients generator of claim 1,
    wherein the second set of input parameters comprises at least one of a set of interference parameters and a set of synchronization error parameters.

16. The channel estimation coefficients generator of claim 1,
wherein the second set of input parameters comprises at least one of the following parameters: a phase for frequency offset rotation, a phase for timing offset rotation, a gain level according to analog gain control.

17. A method for generating channel estimation coefficients for channel estimation filtering, the method comprising:
acquiring a first set of input parameters and a second set of input parameters,
wherein parameters of the first set of input parameters remain approximately unchanged over a first period of time and parameters of the second set of input parameters remain approximately unchanged over a second period of time that is shorter than the first period of time;
generating a first set of channel estimation coefficients based on the first set of input parameters; and
generating a second set of channel estimation coefficients based on the first set of channel estimation coefficients and based on the second set of input parameters.

18. The method of claim 17, comprising:
generating the first set of channel estimation coefficients if the first set of input parameters has changed; and
generating the second set of channel estimation coefficients if at least one input parameter of the second set of input parameters crosses a threshold.

19. The method of claim 17, comprising:
generating the first set of channel estimation coefficients for a selectable subset of the first set of input parameters.

* * * * *